(12) United States Patent
Zhang et al.

(10) Patent No.: US 8,447,294 B2
(45) Date of Patent: May 21, 2013

(54) METHOD AND SYSTEM FOR IMPLEMENTING CELL SELF-HEALING OF BASE STATION IN LONG TERM EVOLUTION SYSTEM

(75) Inventors: Xianzhou Zhang, Shenzhen (CN); Hongfeng Yi, Shenzhen (CN); Wenying Zhang, Shenzhen (CN)

(73) Assignee: ZTE Corporation (CH)

( * ) Notice: Subject to any disclaimer, the term of this patent is extended or adjusted under 35 U.S.C. 154(b) by 215 days.

(21) Appl. No.: 13/142,904

(22) PCT Filed: Sep. 1, 2009

(86) PCT No.: PCT/CN2009/073658
§ 371 (c)(1),
(2), (4) Date: Jun. 30, 2011

(87) PCT Pub. No.: WO2010/081330
PCT Pub. Date: Jul. 22, 2010

(65) Prior Publication Data
US 2011/0269454 A1    Nov. 3, 2011

(30) Foreign Application Priority Data

Dec. 30, 2008  (CN) .......................... 2008 1 0247529

(51) Int. Cl.
*H04W 24/00*  (2009.01)
*H04M 1/00*  (2006.01)
*H04B 1/38*  (2006.01)

(52) U.S. Cl.
USPC ......................................... 455/424; 455/561

(58) Field of Classification Search
USPC .......................................... 455/423–424, 561
See application file for complete search history.

(56) References Cited

U.S. PATENT DOCUMENTS

| 7,715,837 B2 * | 5/2010 | Lehtovirta et al. ............. 455/424 |
| 2003/0162503 A1 * | 8/2003 | LeCren ........................ 455/67.1 |
| 2004/0185907 A1 * | 9/2004 | Lange ............................ 455/561 |

FOREIGN PATENT DOCUMENTS

| CN | 101043638 A | 9/2007 |
| CN | 101232654 A | 7/2008 |
| JP | 2008085568 A | 4/2008 |
| JP | 2008-228254 A | 9/2008 |
| JP | 2009038692 A | 2/2009 |

OTHER PUBLICATIONS

International Search Report for PCT/CN2009/073658, Completed by the Chinese Patent Office on Nov. 25, 2009, 4 Pages.

* cited by examiner

*Primary Examiner* — Steven Lim
(74) *Attorney, Agent, or Firm* — Brooks Kushman, P.C.

(57) ABSTRACT

A method and system for implementing self-healing of base station cells in long term evolution system, and the method comprises: when a base station detects that there is one baseband board abnormal, it judges whether there are redundant baseband resources in the base station that satisfy the minimum bandwidth demand of cells in the abnormal baseband board or not, and if yes, a cell establishment process is initiated to reestablish the cells in the abnormal baseband board; otherwise, redundant bandwidth of the cells from a normal baseband board is acquired as available baseband resources to reestablish the cells in the abnormal baseband board. Said system comprises: a detection unit, a judgment unit, a cell establishment unit and an available baseband resources acquisition unit.

16 Claims, 2 Drawing Sheets

METHOD AND SYSTEM FOR IMPLEMENTING CELL SELF-HEALING OF BASE STATION IN LONG TERM EVOLUTION SYSTEM

CROSS-REFERENCE TO RELATED APPLICATION

This application is the U.S. national phase of PCT Application No. PCT/CN2009/073658 filed Sep. 1, 2009, which claims priority to Chinese Application No. 200810247529.8 filed Dec. 30, 2008, the disclosures of which are incorporated in their entirety by reference herein.

TECHNICAL FIELD

The present invention relates to the technology of establishing the base station cells in the long term evolution (LTE) system of mobile communication, and more especially, to a method and system for implementing the self-healing of the base station cells in the LTE system.

BACKGROUND OF THE RELATED ART

In the LTE system, the function of the self optimizing network (SON) is raised to a very high status, and the function of network self-healing is more and more prominent. In the prior art, the base station, that is, the Evolution Node B (eNB) is generally designed by way of baseband pool, and the baseband resources are related to the bandwidth of the LTE system: the larger the bandwidth of the LTE system, the more baseband resources occupied, and the baseband resources are mapped to each baseband board, and the processing capability of each baseband board is certain. The eNB establishes each cell with a certain amount of baseband resources. If the eNB has reserved baseband resources and a certain baseband board that has no reserved baseband resources is abnormal, the cells can be reestablished on the baseband board having the reserved baseband resources in the eNB according to the principle of baseband resources sharing.

FIG. 1 is a schematic diagram of the structure of the eNB composition in the LTE system, and as shown in FIG. 1, the eNB consists of a baseband processing unit and a radio remote unit, wherein, the baseband processing unit comprises at least one main controlling board, a plurality of baseband boards and at least one interface board, and the baseband processing unit is interconnected with the radio remote unit through the interface board.

The problem in the prior art is: if the eNB has not reserved unoccupied baseband resources, then when there is a baseband board abnormal, the cells in the abnormal baseband board cannot continue to provide services to the subscribers; or if there are reserved unoccupied baseband resources but the reserved baseband resources cannot meet the minimum bandwidth demand of the cell in the abnormal baseband board, the cell still cannot continue to provide services to the subscribers, such that it brings significant inconvenience to the subscribers in the cell.

SUMMARY OF THE INVENTION

Due to the above reasons, the main purpose of the present invention is to offer a method and system for implementing the self-healing of the base station cells in the LTE system to implement the reestablishment of the cells in the abnormal baseband board when the unoccupied baseband resources in the eNB system cannot meet the minimum bandwidth demand of the cells in the abnormal baseband board.

In order to achieve the above purpose, the technical scheme of the present invention is implemented as follows:

The present invention offers a method for implementing the self-healing of the base station cells in the long term evolution (LTE) system, and the method comprises:

when the base station detects that there is baseband board abnormal, it judges whether there are unoccupied baseband resources in the base station to meet the minimum bandwidth demand of the cells in the abnormal baseband board or not, and if yes, it initiates a cell establishment process to reestablish the cells in the abnormal baseband board; otherwise, acquires the redundant bandwidth of the cell from the normal baseband board as the available baseband resources to reestablish the cells in the abnormal baseband board.

In the above technical scheme, said step of acquiring the redundant bandwidth of the cell from the normal baseband board as the available baseband resources and reestablishing the cells in the abnormal baseband board comprises:

the base station searches for the cell with the maximum bandwidth in the normal baseband board, and decreases the bandwidth of the searched-out cell to acquire the available baseband resources; the base station judges whether the available baseband resources meet the minimum bandwidth demand of the cells in the abnormal baseband board or not, and if no, the base station continues to search for the cell with the maximum bandwidth in the normal baseband board to further acquire the available baseband resources; otherwise, the eNB initiates the cell establishment process to reestablish the cells in the abnormal baseband board.

In the above technical scheme, said minimum bandwidth of the cells in the abnormal baseband board is the product of the minimum bandwidth supported by the LTE system and the number of cells.

In the above technical scheme, said step of decreasing bandwidth of the cell with the maximum bandwidth is decreasing the bandwidth of the cell with the maximum bandwidth to the bandwidth of the next lower level corresponding to the current bandwidth of the cell supported by the LTE system.

In the above technical scheme, said step of continuing to search for the cell with the maximum bandwidth in the normal baseband board comprises:

The eNB judges whether the bandwidths of all cells in the normal baseband boards reach to the minimum bandwidth supported by the LTE system or not, and if no, perform the step of continuing to search for the cell with the maximum bandwidth, otherwise, the eNB selectively initiates the cell establishment process to reestablish the cells in the abnormal baseband board according to the bandwidth of the available baseband resources and the priorities of the cells in the abnormal baseband board.

In the above technical scheme, said priorities are set according to the cell coverage area and/or the number of subscribers.

In the above technical scheme, the minimum bandwidth supported by said LTE system is 1.4 MHz.

In the above technical scheme, said decreasing the bandwidth of the cell with the maximum bandwidth takes not affecting provision of the services for the subscribers made by the cell and implementing the optimal cell bandwidth assignment as standards.

The present invention also offers a system for implementing the self-healing of the base station cells in the LTE, and the system comprises:

a detection unit, which is configured to detect whether there is a baseband board abnormal in the base station or not, and send the abnormal information of the baseband board to a judgment unit if yes;

a judgment unit, which is configured to judge whether the base station has unoccupied baseband resources to meet the minimum bandwidth demand of the cells in the abnormal baseband board or not according to the abnormal information of the baseband board, and if yes, send a request for establishing cells in the abnormal baseband board to a cell establishment unit, otherwise, send a request for acquiring the available baseband resources to an available baseband resources acquisition unit;

a cell establishment unit, which is configured to establish the corresponding cells according to the request for establishing cells in the abnormal baseband board;

an available baseband resources acquisition unit, which is configured to acquire the redundant bandwidth of the cell in the normal baseband board according to the request for acquiring the available baseband resources.

In the above technical scheme, said available baseband resources acquisition unit also comprises:

a searching module, which is configured to search for the cell with the maximum bandwidth from the normal baseband board and send the cell bandwidth information to an available baseband resources acquisition module;

an available baseband resources acquisition module, which is configured to acquire the available baseband resources according to the cell bandwidth information and the request for acquiring the available baseband resources;

a judgment module, which is configured to judge whether the available baseband resources meet the minimum bandwidth demand of the cells in the abnormal baseband board or not, and if yes, send the request for establishing the cells in the abnormal baseband board to the cell establishment unit, otherwise, send the request for acquiring the available baseband resources to the available baseband resources acquisition module.

Compared with the prior techinic, the method and system for implementing the self-healing of the cells in the LTE system in accordance with the present invention decreases the bandwidth of the cells in the normal baseband board in the eNB to acquire available baseband resources to meet the minimum bandwidth demand of the cells in the abnormal baseband board if the eNB does not reserve unoccupied baseband resources or the reserved unoccupied baseband resources do not meet the minimum bandwidth demand of the cells in the abnormal baseband board when there is a baseband board abnormal, and it initiates the cell establishment process to reestablish the cells in the abnormal baseband board, so as to guarantee the continuity of the services provided by the operators, and to improve the satisfaction of the users with the operators and the honesty degree of the operators to the users.

PREFERRED EMBODIMENTS OF THE PRESENT INVENTION

The basic idea of the present invention is: when a baseband board in the eNB is abnormal and the eNB has no unoccupied baseband resources or the unoccupied baseband resources are not enough to meet the minimum bandwidth demand of the cells in the abnormal baseband board, the bandwidth of the cells in the normal baseband board in the eNB is decreased to acquire the available baseband resources which meets the minimum bandwidth demand of the cells in the abnormal baseband board, and the cells in the abnormal baseband board are reestablished, so as to guarantee the continuity of the services provided by the operators.

Figure 1:
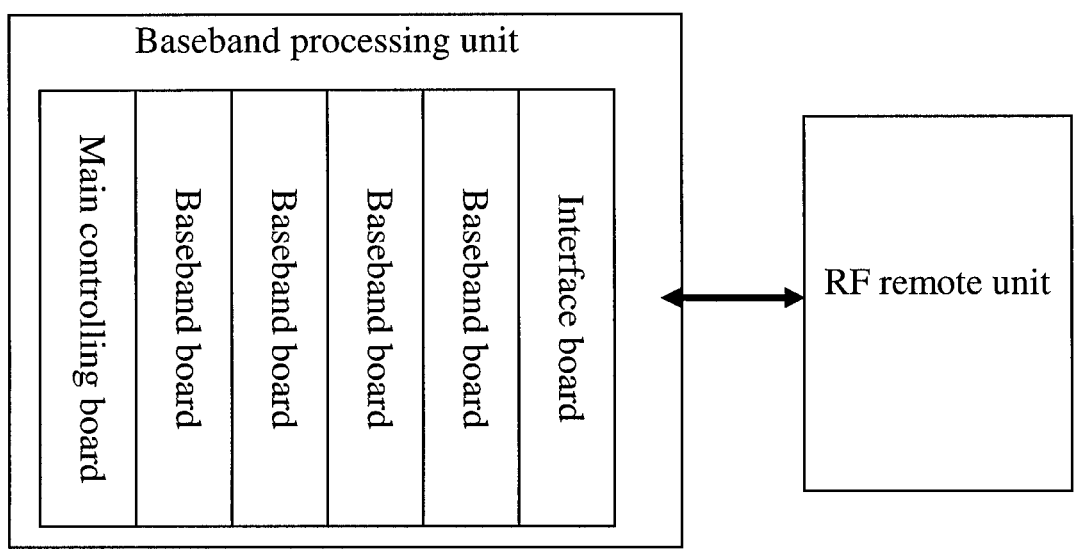
FIG. 1 is a structural schematic diagram of the eNB composition in the LTE system.
Figure 2:
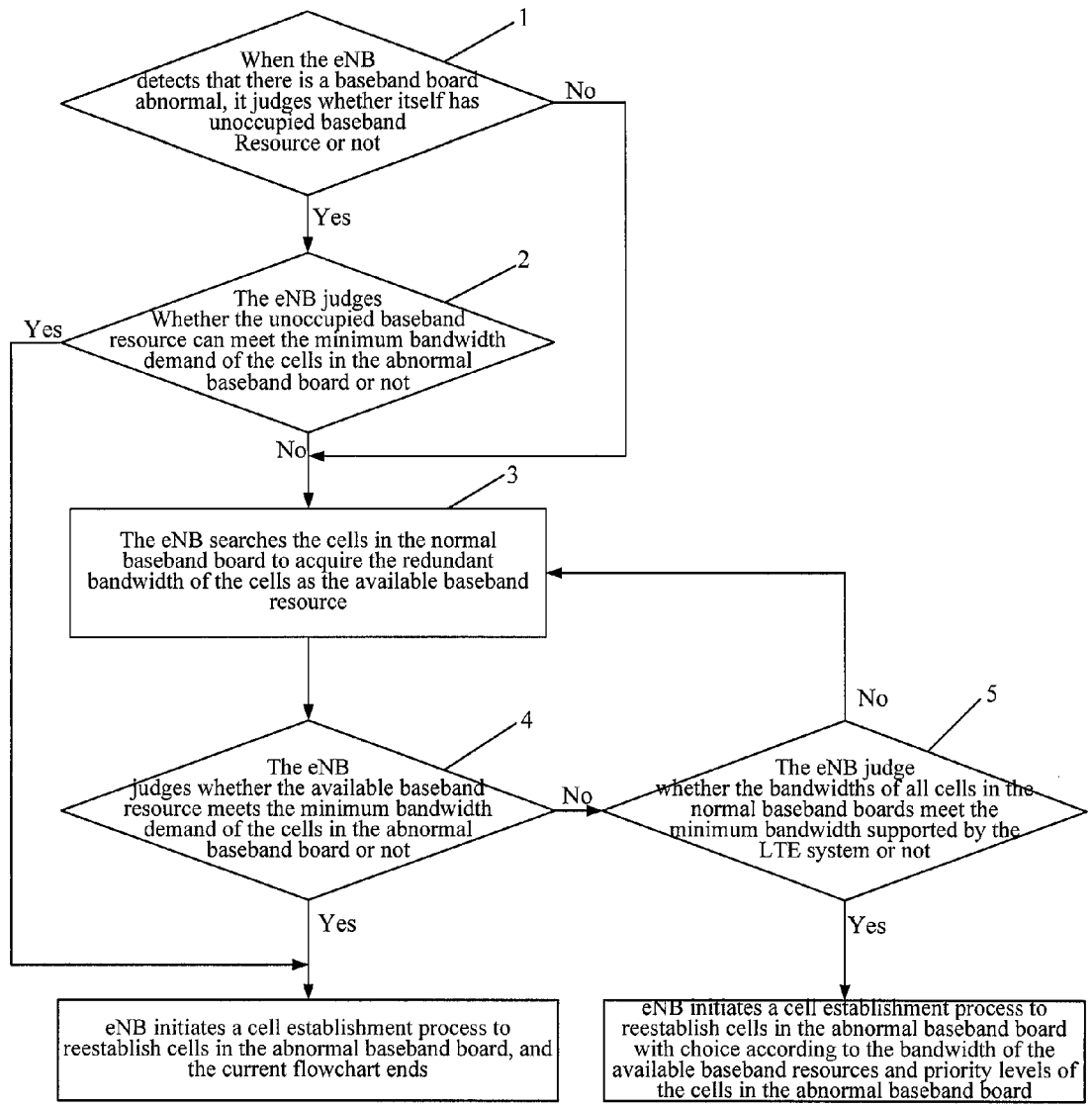
FIG. 2 is a flow chart of the method for implementing the self-healing of the eNB cell in the LTE system.

FIG. 2 is a flow chart of the method for implementing the self-healing of the eNB cells in the LTE system, as shown in FIG. 2, the implementing method comprises:

Step 1: when the eNB detects that there is a baseband board abnormal, the eNB judges whether there are unoccupied baseband resources in the eNB or not, and if yes, proceed to step 2, otherwise, proceed to step 3;

in this step, a baseband board being abnormal generally means that a baseband board is faulted or suddenly plugged out.

Step 2, the eNB judges whether the unoccupied baseband resources can meet the minimum bandwidth demand of the cells in the abnormal baseband board or not, and if yes, the eNB initiates a cell establishment process to reestablish the cells in the abnormal baseband board, and end the current process, otherwise, proceed to step 3;

in this step, the minimum bandwidth of the cells in the abnormal baseband board is: the product of the minimum bandwidth supported by the LTE system and the number of the cells.

Step 3, the eNB searches for the cells in the normal baseband board to acquire the redundant bandwidth of the cells as the available baseband resources;

in this step, the eNB searches the cells with the maximum bandwidth in the normal baseband boards according to the information of the bandwidth of the cells in all baseband boards stored in the eNB, and decreases the bandwidth of the cells whose bandwidth is maximum, taking not affecting provision of the services made by the cells for the users and implementing the optimal assignment of cell bandwidth as standards.

Said redundant bandwidth is: the bandwidth resources of the cells exceeding the minimum bandwidth supported by the LTE system.

Said searching can be that the eNB randomly searches for the cells in all the baseband boards, or that according to the size of the bandwidth of the cells, the cell bandwidth information list is established in the eNB, and the eNB searches according to the cell bandwidth information list which is updated at any time according to the condition of current bandwidth of the cells.

Said optimal assignment of cell bandwidth means:

1) According to the bandwidth standard supported by the LTE system, decrease the bandwidth of the searched-out cell to the bandwidth of next lower level corresponding to the current bandwidth of the cell supported by the LTE system to prevent from over-decreasing the bandwidth of a cell, which severely affects the service quality in the cell; wherein, the standards of the cell bandwidth supported by the LTE system are 20 MHz, 15 MHz, 10 MHz, 5 MHz, 3 MHz and 1.4 MHz;

2) If there are multiple cells with the same bandwidth, then select the one with the minimum coverage area and/or the minimum number of subscribers to decrease its bandwidth.

Step 4, the eNB judges whether the available baseband resources meet the minimum bandwidth demand of the cells in the abnormal baseband board or not, and if no, proceed to step 5, otherwise, the eNB initiates the cell establishment process to reestablish the cells in the abnormal baseband board, and end the current process.

Step 5, the eNB judges whether the bandwidths of all cells in the normal baseband boards reach to the minimum bandwidth supported by the LTE system or not, and if no, return to step 3, otherwise, the eNB selectively initiates the cell establishment process to reestablish the cells in the abnormal baseband board according to the bandwidth of the available baseband resources and the priorities of the cells in the abnormal baseband board;

in this step, the priorities of the cells are set according to the cell coverage area and/or the number of subscribers: the larger the cell coverage area is and/or the larger the number of subscribers is, the higher priority the cell has. Since the available baseband resources do not meet the minimum bandwidth demand of the cells in the abnormal baseband board, that is, the reestablishment of all the cells in the abnormal baseband board cannot be implemented, then select the cells that need to be reestablished according to the cell coverage area and/or the number of users.

Different cell bandwidth occupies different baseband resources, and the baseband resources in one baseband board are limited, thus the supported radio bandwidth is limited. If one baseband board in the eNB is abnormal and the eNB does not reserve the baseband resources or the reserved baseband resources are not enough, decrease the bandwidth of the cells in the normal baseband board according to a certain principle, and the available baseband resources which have just become unoccupied can meet the minimum bandwidth demand of all cells in the abnormal baseband board, that is the 1.4 MHz baseband resources occupied by each cell, use the available baseband resources which are unoccupied to reestablish the cells and continue to offer the subscribers services.

If the available baseband resources which have just become unoccupied cannot meet the minimum bandwidth demand of all cells in the abnormal baseband board and the bandwidth of all cells in the normal baseband board reaches to the minimum bandwidth supported by the LTE system, the eNB selectively initiates the cell establishment process to reestablish the cells in the abnormal baseband board according to the bandwidth of the available baseband resources and the priorities of the cells in the abnormal baseband board.

In the following, the method for implementing the self-healing of the eNB cells in the LTE system in accordance with the present invention will be explained specifically.

Suppose that one of the baseband boards in the eNB is faulted, and the baseband board has two cells, which are cell A and cell B respectively, and in this embodiment, the minimum bandwidth of cell A and cell B is: 1.4M×2=2.8 MHz, then the method for implementing the self-healing of cell A and cell B comprises the following steps:

Step 10: the eNB detects that the baseband board is abnormal, and eNB judges if there are unoccupied baseband resources in the eNB, and if yes, proceed to step 11, otherwise, proceed to step 12;

Step 11, eNB judges whether the unoccupied baseband resources meet the minimum bandwidth demand of cells A and B in abnormal baseband board, and if yes, eNB initiates an establishment process of the cells A and B to reestablish the cells A and B, and end the current process; if no, proceed to step 12;

Step 12, the eNB searches for the cell with the maximum bandwidth in the normal baseband board, and decreases the bandwidth of the searched-out cell to acquire the available baseband resources;

in this step, if the eNB searches out the cell with the maximum bandwidth of 20 MHz, it decreases the bandwidth to 15 MHz to acquire the available baseband resources of 5 MHz; if the eNB searches out the cell with the maximum bandwidth of 15 MHz, it decreases the bandwidth to 10 MHz to acquire the available baseband resources of 5 MHz; if the eNB searches out the cell with the maximum bandwidth of 10 MHz, it decreases the bandwidth to 5 MHz to acquire the available baseband resources of 5 MHz; if searching out the cell with maximum bandwidth of 5 MHz, then decrease the bandwidth to 3 MHz to acquire the available baseband resources of 2 MHz; if searching out the cell with the maximum bandwidth of 3 MHz, decrease the bandwidth to 1.4 MHz to acquire the available baseband resources of 1.6 MHz.

Step 13, the eNB judges whether the available baseband resources meet minimum bandwidth demand of the cells in the abnormal baseband board or not, and if no, proceed to step 14, otherwise, the eNB initiates the establishment process of the cells A and B to reestablish cell A and cell B, and end the current process.

In this step, if the cell with the maximum bandwidth of 5 MHz or 3 MHz is searched out in step 12, the available baseband resources of 2 MHz or 1.6 MHz can be acquired respectively, which does not meet the minimum bandwidth demand of 2.8 MHz of the cell A and cell B, then proceed to step 14;

If the cell with the maximum bandwidth of 20 MHz, 15 MHz or 10 MHz is searched out in step 12, available baseband resources of 5 MHz can be acquired, thus the minimum bandwidth demand of 2.8 MHz of cell A and cell B can be met, and the establishment process of the cell A and cell B can be initiated. Generally, assign the corresponding baseband resources to the cells according to the cell coverage area and/or the number of subscribers. In this embodiment, suppose that the coverage area of cell A and the number of subscribers are larger, then baseband resources of 3 MHz are assigned to cell A while baseband resources of 1.4 MHz are assigned to cell B when there are available baseband resources of 5 MHz, thus cell A and cell B can continue to offer the subscribers services.

Step 14, the eNB judges whether the bandwidths of all cells in the normal baseband boards reach to the minimum bandwidth supported by the LTE system or not, and if no, return to step 12 to continue to acquire the available baseband resources, otherwise, the eNB selectively initiates the cell establishment process to reestablish the cells in the abnormal baseband board according to the bandwidth of the available baseband resources and the priorities of the cells in the abnormal baseband board;

in this step, if the available baseband resources cannot meet the minimum bandwidth demand of 2.8 MHz of cell A and cell B in the abnormal baseband board, and the bandwidths of all cells in the normal baseband boards reach to the minimum bandwidth of 1.4 MHz supported by the LTE system, since the priority of cell A is higher than that of cell B, the eNB prefers to reestablish cell A.

The present invention also provides a system for implementing the self-healing of base station cells in the LTE system to perform the above method for implementing the self-healing of base station cells in the LTE, and the implementing system comprises: a detection unit, a judgment unit, a cell establishment unit and an available baseband resources acquisition unit; wherein, the detection unit is used to detect whether there is a baseband board abnormal in the base station or not, and if yes, the detection unit sends abnormal information of the baseband board to the judgment unit; according to the abnormal information of the baseband board, the judgment unit is used to judge whether the base station has unoccupied baseband resources to meet the minimum bandwidth demand of the cells in the abnormal baseband board or not, and if yes, the judgment unit sends the request for establishing the cells in the abnormal baseband board to the cell establishment unit, otherwise, the judgment unit sends the request for acquiring the available baseband resources to the available baseband resources acquisition unit; the cell establishment unit is used to establish the corresponding cell according to the request for establishing the cells in the abnormal baseband board; the available baseband resources acquisition unit is used to acquire the unoccupied bandwidth of the cell from the normal baseband boards according to the request for acquiring the available baseband resources.

Said available baseband resources acquisition unit further comprises: a searching module, an available baseband resources acquisition module and a judgment module; wherein, the searching module is used to search for the cell with the maximum bandwidth in the normal baseband board and send the bandwidth information of the cell to the available baseband resources acquisition module; the available baseband resources acquisition module is used to acquire the available baseband resources according to the cell bandwidth information and the request for acquiring the available baseband resources; the judgment module is used to judge whether the available baseband resources meet the minimum bandwidth demand of the cells in the abnormal baseband board or not, and if yes, send the request for establishing the cells in the abnormal baseband board to the cell establishment unit, otherwise, send the request for acquiring the available baseband resources to the available baseband resources acquisition module.

Before sending the request for acquiring the available baseband resources to the available baseband resources acquisition module, the above judgment module might firstly judge whether the bandwidths of all cells in the normal baseband boards reach to the minimum bandwidth supported by the LTE system or not, and if no, the judgment module sends the request for acquiring the available baseband resources to the available baseband resources acquisition module; otherwise, the judgment module selectively sends the request for establishing the cells in the abnormal baseband board to the cell establishment unit according to the bandwidth of the available baseband resources and the priorities of the cells in the abnormal baseband board, and the cell establishment unit establishes the corresponding cells according to the request for establishing the cells in the abnormal baseband board.

When there is a baseband board abnormal, the method and system of the present invention acquire available baseband resources to meet the minimum bandwidth demand of the cells in the abnormal baseband board by decreasing the bandwidth of the cells in the normal baseband board, and reestablishes the cells, thus to guarantee the continuity of services provided by the operators.

The above description is only preferred embodiments rather than the restriction of the protection scope of the present invention.

INDUSTRIAL APPLICABILITY

When there is one baseband board abnormal, the method and system of the present invention acquires available baseband resources to meet the minimum bandwidth demand of the cells in the abnormal baseband board by decreasing the bandwidth of the cells in the normal baseband board, and reestablishes the cells, thus to guarantee the continuity of the operator offering services.

What is claimed is:

1. A method for implementing self-healing of a base station cell in long term evolution system, the method comprising:
   when detecting that there is an abnormal baseband board, a base station judging whether there are unoccupied baseband resources in the base station to meet the minimum bandwidth demand of cells in the abnormal baseband board or not, and if yes, initiating a cell establishment process to reestablish the cells in the abnormal baseband board; otherwise, acquiring a redundant bandwidth of a cell from a normal baseband board as available baseband resources to reestablish the cells in the abnormal baseband board.

2. The method for implementing self-healing of a base station cell in long term evolution system according to claim 1, wherein, said step of acquiring the redundant bandwidth of the cell in the normal baseband board as the available baseband resources and reestablishing the cells in the abnormal baseband board comprises:
   the base station searching for a cell with the maximum bandwidth in the normal baseband board, and decreasing the bandwidth of the searched-out cell to acquire the available baseband resources;
   the base station judging whether the acquired available baseband resources meet the minimum bandwidth demand of the cells in the abnormal baseband board or not, and if no, the base station continuing to search for the cell with the maximum bandwidth in the normal baseband board to further acquire the available baseband resources; otherwise, the base station initiating the cell establishment process to reestablish the cells in the abnormal baseband board.

3. The method for implementing self-healing of a base station cell in long term evolution system according to claim 2, wherein, the minimum bandwidth of the cells in the abnormal baseband board is a product of the minimum bandwidth supported by the long term evolution system and the number of cells in the abnormal baseband board.

4. The method for implementing self-healing of a base station cell in long term evolution system according to claim 3, wherein, said step of decreasing the bandwidth of the searched-out cell is decreasing the bandwidth of the cell with the maximum bandwidth in the normal baseband board to a bandwidth of a next lower level corresponding to current bandwidth of the cell supported by the long term evolution system.

5. The method for implementing self-healing of a base station cell in long term evolution system according to claim 4, wherein, said step of continuing to search for the cell with the maximum bandwidth in the normal baseband board to further acquire the available baseband resources comprises:
   the base station judging whether the bandwidths of all cells in the normal baseband boards reaches to the minimum bandwidth supported by the long term evolution system or not, and if no, continuing to search for the cell with the maximum bandwidth to further acquire the available baseband resources; otherwise, the base station selectively initiating the cell establishment process to reestablish the cells in the abnormal baseband board according to the bandwidth of the acquired available baseband resources and the priorities of the cells in the abnormal baseband board.

6. The method for implementing self-healing of a base station cell in long term evolution system according to claim 5, wherein, said priorities are set according to cell coverage area and/or the number of subscribers in cell.

7. The method for implementing self-healing of a base station cell in long term evolution system according to claim 6, wherein, the minimum bandwidth supported by said long term evolution system is 1.4 MHz.

8. The method for implementing self-healing of a base station cell in long term evolution system according to claim 1, wherein, said step of decreasing the bandwidth of the searched-out cell is implemented by the following standards:
   not affecting provision of services by the cell for the subscriber; and
   implementing optimal assignment of bandwidth in each cell.

9. The method for implementing self-healing of a base station cell in long term evolution system according to claim 2, wherein, said step of decreasing the bandwidth of the searched-out cell is implemented by the following standards:
   not affecting provision of services by the cell for the subscriber; and
   implementing optimal assignment of bandwidth in each cell.

10. The method for implementing self-healing of a base station cell in long term evolution system according to claim 3, wherein, said step of decreasing the bandwidth of the searched-out cell is implemented by the following standards:
    not affecting provision of services by the cell for the subscriber; and
    implementing optimal assignment of bandwidth in each cell.

11. The method for implementing self-healing of a base station cell in long term evolution system according to claim 4, wherein, said step of decreasing the bandwidth of the searched-out cell is implemented by the following standards:
    not affecting provision of services by the cell for the subscriber; and
    implementing optimal assignment of bandwidth in each cell.

12. The method for implementing self-healing of a base station cell in long term evolution system according to claim 5, wherein, said step of decreasing the bandwidth of the searched-out cell is implemented by the following standards:
    not affecting provision of services by the cell for the subscriber; and
    implementing optimal assignment of bandwidth in each cell.

13. The method for implementing self-healing of a base station cell in long term evolution system according to claim 6, wherein, said step of decreasing the bandwidth of the searched-out cell is implemented by the following standards:
    not affecting provision of services by the cell for the subscriber; and
    implementing optimal assignment of bandwidth in each cell.

14. The method for implementing self-healing of a base station cell in long term evolution system according to claim 7, wherein, said step of decreasing the bandwidth of the searched-out cell is implemented by the following standards:
    not affecting provision of services by the cell for the subscriber; and
    implementing optimal assignment of bandwidth in each cell.

15. A system for implementing self-healing of a base station cell in long term evolution system, said system comprising:
    a detection unit configured to detect whether there is an abnormal baseband board in a base station or not, and to send abnormal information of a baseband board to a judgment unit if yes;
    a judgment unit configured to judge whether the base station has unoccupied baseband resources to meet the minimum bandwidth demand of cells in the abnormal baseband board according to the abnormal information of the baseband board, and if yes, to send a request for establishing the cells in the abnormal baseband board to a cell establishment unit, otherwise, to send a request for acquiring available baseband resources to an available baseband resources acquisition unit;
    a cell establishment unit configured to establish the cells for the abnormal baseband board according to the request for establishing the cells in the abnormal baseband board; and
    an available baseband resources acquisition unit configured to acquire redundant bandwidth of a cell from a normal baseband board according to the request for acquiring available baseband resources.

16. The system according to claim 15, wherein said available baseband resources acquisition unit comprises:
    a searching module configured to search for a cell with the maximum bandwidth in the normal baseband board and to send cell bandwidth information to an available baseband resources acquisition module;
    an available baseband resources acquisition module configured to acquire the available baseband resources according to the cell bandwidth information and the request for acquiring available baseband resources; and
    a judgment module configured to judge whether the available baseband resources meet the minimum bandwidth demand of the cells in the abnormal baseband board or not, and if yes, to send the request for establishing the cells in the abnormal baseband board to the cell establishment unit, otherwise, to send the request for acquiring available baseband resources to the available baseband resources acquisition module.

* * * * *